United States Patent
Botha

(10) Patent No.: US 11,918,963 B2
(45) Date of Patent: Mar. 5, 2024

(54) NANO-BUBBLE GENERATOR AND METHOD OF GENERATING NANO-BUBBLES USING INTERFERING MAGNETIC FLUX FIELDS

(71) Applicant: Quartus Paulus Botha, Porterville (ZA)

(72) Inventor: Quartus Paulus Botha, Porterville (ZA)

( * ) Notice: Subject to any disclaimer, the term of this patent is extended or adjusted under 35 U.S.C. 154(b) by 1378 days.

(21) Appl. No.: 16/337,453

(22) PCT Filed: Sep. 6, 2017

(86) PCT No.: PCT/ZA2017/050054
§ 371 (c)(1),
(2) Date: Mar. 28, 2019

(87) PCT Pub. No.: WO2018/064689
PCT Pub. Date: Apr. 5, 2018

(65) Prior Publication Data
US 2019/0344231 A1     Nov. 14, 2019

(30) Foreign Application Priority Data

Sep. 28, 2016   (ZA) .................................. 2016/06731

(51) Int. Cl.
*B01F 33/82*       (2022.01)
*B01F 23/232*      (2022.01)
*B01F 23/233*      (2022.01)
*B01F 23/2373*     (2022.01)
*B01F 23/2375*     (2022.01)
(Continued)

(52) U.S. Cl.
CPC ...... *B01F 33/8212* (2022.01); *B01F 23/2323* (2022.01); *B01F 23/233* (2022.01);
(Continued)

(58) Field of Classification Search
CPC .. B01F 35/3204; B01F 35/221; B01F 35/754; B01F 2101/36; B01F 33/5022;
(Continued)

(56) References Cited

U.S. PATENT DOCUMENTS 5,888,403 A *  3/1999  Hayashi .............. B01F 25/4316
                                            210/201
8,097,166 B2 *  1/2012  Nakashima ......... B01F 27/2712
                                            210/695
(Continued)

FOREIGN PATENT DOCUMENTS

CN          2835224      11/2006
CN        201729714       2/2011
(Continued)

*Primary Examiner* — Charles Cooley
(74) *Attorney, Agent, or Firm* — Billion & Armitage

(57) ABSTRACT

A nano-bubble generator includes: (i) a housing defining: an inlet for receiving a liquid with entrained macro-bubbles: a first chamber operatively downstream of the inlet; a second chamber operatively downstream of the first chamber; and an outlet operatively downstream of the second chamber; (ii) at least one blade disposed within the first chamber for, in use, cutting macro-bubbles entrained in the liquid to convert such macro-bubbles into micro-bubbles; (iii) at least one first magnet within the second chamber; and (iv) at least one second magnet associated with the second chamber, wherein: (a) the at least one first magnet and the at least one second magnet are arranged such that the polarity of the at least one first magnet is opposed to the polarity of the at least one second magnet; and (b) the at least one first magnet is movable relative to the at least one second magnet.

7 Claims, 2 Drawing Sheets

(51) Int. Cl.
  *B01F 25/312* (2022.01)
  *B01F 25/4314* (2022.01)
  *B01F 33/453* (2022.01)
  *B01F 101/48* (2022.01)

(52) U.S. Cl.
  CPC ...... *B01F 23/2375* (2022.01); *B01F 25/3121* (2022.01); *B01F 25/31242* (2022.01); *B01F 25/43141* (2022.01); *B01F 33/4531* (2022.01); B01F 23/2373 (2022.01); B01F 2101/48 (2022.01)

(58) Field of Classification Search
  CPC ......... B01F 27/1121; B05D 1/40; B05D 1/26; B05C 5/02; B05C 5/0204; B05C 5/00; B05C 9/12; B05C 11/00
  USPC ....................................................... 210/695
  See application file for complete search history.

(56) References Cited

U.S. PATENT DOCUMENTS

2006/0027504 A1* 2/2006 Nakashima ........... B03C 1/0332
  210/695
2006/0266689 A1* 11/2006 Mori ......................... C02F 5/00
  210/695
2019/0344231 A1* 11/2019 Botha ............... B01F 25/31242
2022/0297068 A1* 9/2022 Simmons ............ F16C 32/0425

FOREIGN PATENT DOCUMENTS

| | | | | |
|---|---|---|---|---|
| CN | 102815799 | | 12/2012 | |
| CN | 102847453 | | 1/2013 | |
| IN | 201586484 | | 9/2010 | |
| JP | 2004074131 | | 3/2004 | |
| JP | 2009112187 | | 5/2009 | |
| JP | 2011230025 | | 11/2011 | |
| KR | 20110051760 | A * | 5/2011 | |
| KR | 20110051761 | A * | 5/2011 | |
| KR | 20110051762 | A * | 5/2011 | |
| KR | 20130101185 | | 9/2013 | |
| KR | 102511087 | B1 * | 4/2023 | |
| WO | 9916713 | | 4/1999 | |
| WO | WO-2004016344 | A1 * | 2/2004 | ......... B01F 13/0827 |
| WO | 2007023864 | | 3/2007 | |
| WO | WO-2007023864 | A1 * | 3/2007 | ......... B01F 13/0827 |
| WO | WO-2007105585 | A1 * | 9/2007 | ........... A01K 63/045 |
| WO | WO-2007135979 | A1 * | 11/2007 | ......... B01F 13/0001 |
| WO | WO-2018064689 | A1 * | 4/2018 | ......... B01F 13/0006 |
| WO | WO-2018100553 | A1 * | 6/2018 | |

* cited by examiner

NANO-BUBBLE GENERATOR AND METHOD OF GENERATING NANO-BUBBLES USING INTERFERING MAGNETIC FLUX FIELDS

BACKGROUND

The present invention relates to a nano-bubble generator and a method of generating nano-bubbles. More particularly, the present invention relates to a nano-bubble generator that includes a first module for converting macro-bubbles entrained in a liquid to micro-bubbles and a second module that converts such micro-bubbles to nano-bubbles using magnets.

Various devices for generating nano-bubbles are known. For example:

KR20130101185 "Hybrid micro nano bubble", CN2835224 "Pressurized magnetized screw aerator", CN201586484 "Magnetic force bubble generator, CN201729714 "Microscopic bubble aerator for fish and prawn culturing pond" and WO99/16713 "Water quality purification device" describe nano-bubble generators that use magnets to generate such bubbles; and JP2004/074131 "Liquid containing micro-bubbles and its production method", JP2009/112187 "Rotating device and bubble generator having same" and WO2007/023864 "Bubble generator" describe a bubble generator that includes two sets of opposed magnets, wherein one of the sets of magnets is rotatable relative to the other set of magnets.

A drawback of prior art nano-bubble generators is that they do not use a two-phase process to: (i) convert macro-bubbles to micro-bubbles; and (ii) convert micro-bubbles to nano-bubbles. Without use of a static mixer to during the first phase, a significant portion of the nano-bubbles generated using prior art generators escape from the liquid within a relatively short period of time. It is an object of the present invention to address this drawback.

SUMMARY OF THE INVENTION

According to a preferred embodiment of a first aspect of the invention, there is provided a nano-bubble generator that includes:

a housing defining:
- an inlet for receiving a liquid with entrained macro-bubbles;
- a first chamber operatively downstream of the inlet;
- a second chamber operatively downstream of the first chamber; and
- an outlet operatively downstream of the second chamber;

at least one blade disposed within the first chamber for, in use, cutting macro-bubbles entrained in the liquid to convert such macro-bubbles into micro-bubbles;

at least one first magnet within the second chamber; and at least one second magnet associated with the second chamber, wherein: (i) the at least one first magnet and the at least one second magnet are arranged such that the polarity of the at least one first magnet is opposed to the polarity of the at least one second magnet; and (ii) the at least one first magnet is movable relative to the at least one second magnet.

Typically, the first chamber with the at least one blade disposed therein comprises a static mixer.

Generally, the at least one first magnet is mounted on a rotatable first disc.

Preferably, the nano-bubble generator further includes a venturi disposed operatively upstream of the housing inlet for, in use, introducing macro-bubbles into liquid flowing towards the housing inlet.

Typically, the venturi includes a gas inlet at or near the venturi constricted section.

Generally, only the venturi includes a gas inlet, such that the only gas that is introduced into the liquid is introduced into the liquid via the venturi.

According to a preferred embodiment of a second aspect of the invention, there is provided a method of generating nano-bubbles using a nano-bubble generator according to the first aspect of the invention, which method includes the steps of:

the venturi introducing into a liquid at least 1,000,000 bubbles having a diameter greater than 50 µm per 1,000 ml of liquid;

the static mixer reducing the size of bubbles entrained in the liquid such that each 100 ml of liquid exiting the first chamber includes at least 10,000,000 bubbles having a diameter between 1 µm and 50 µm; and the opposed at least one first magnet and at least one second magnet further reducing the size of bubbles entrained in the liquid such that each 1 ml of liquid exiting the second chamber includes at least 100,000,000 bubbles having a diameter less than 100 nm.

BRIEF DESCRIPTION OF THE DRAWINGS

The invention will now be described in more detail, by way of example only, with reference to the accompanying drawings in which.

DESCRIPTION OF THE INVENTION

Figure 1:
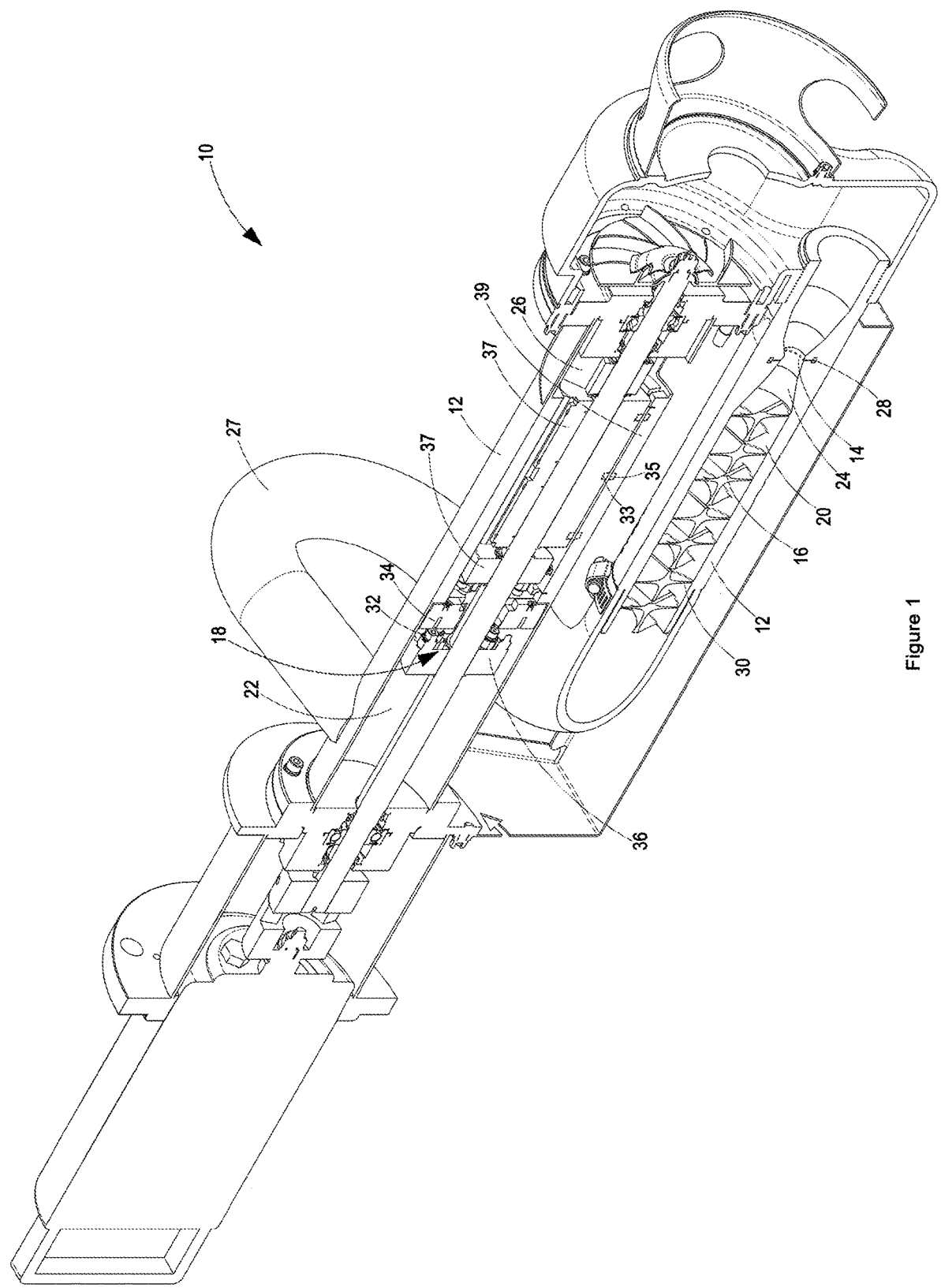
FIG. 1 is a side cross-sectional view of a nano-bubble generator according to a preferred embodiment of a first aspect of the invention.
Figure 2:
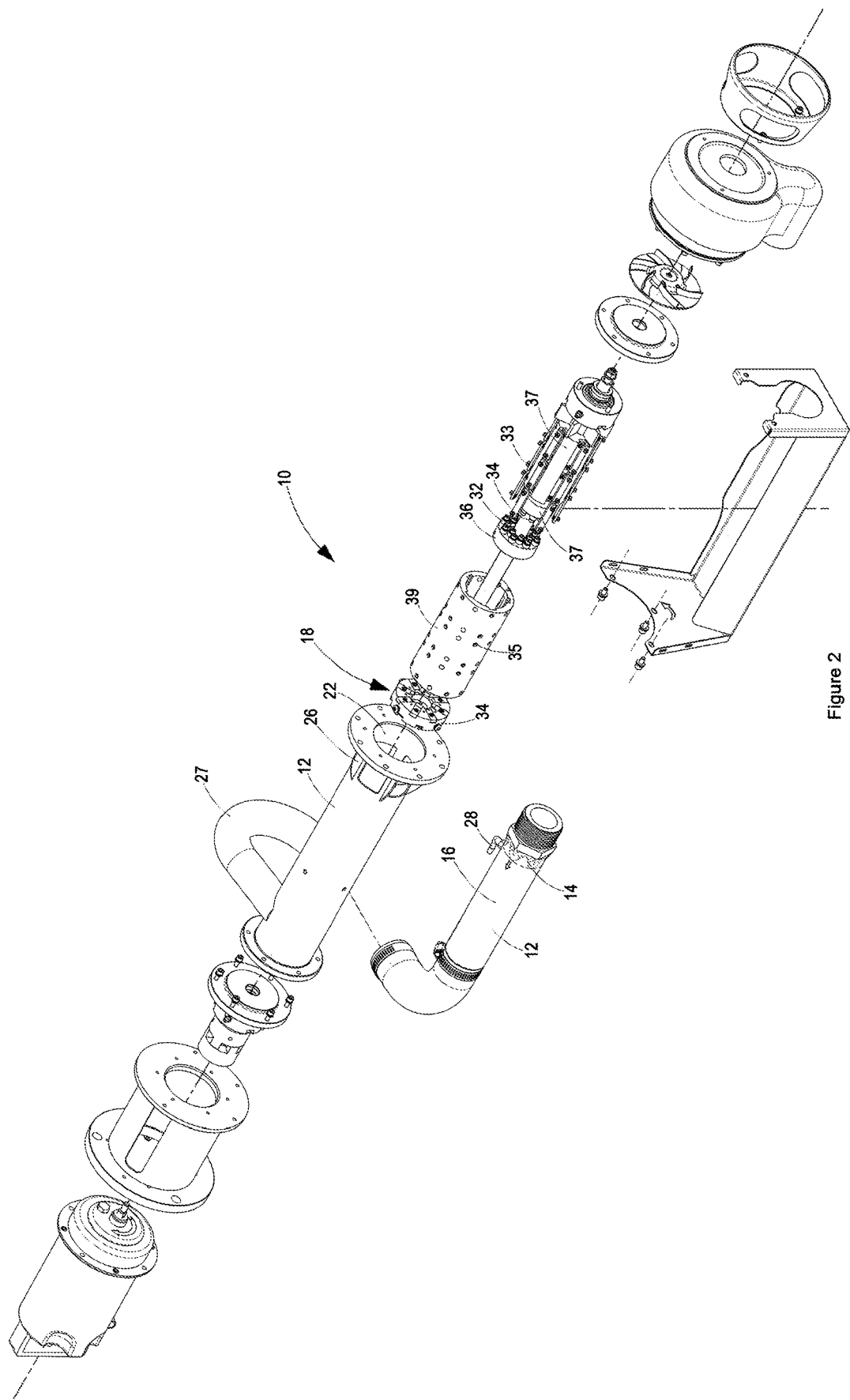
FIG. 2 is an exploded perspective view of the nano-bubble generator in FIG. 1.

With reference to FIGS. 1 and 2 of the drawings, a nano-bubble generator 10 is provided for entraining nano-bubbles of gas into a liquid. The nano-bubble generator 10 includes a housing 12, a venturi 14, a static mixer 16 and a magnetic bubble divider 18.

The housing 12 (which is formed in multiple parts) defines a first chamber 20, a second chamber 22, an inlet 24 to the first chamber 20 and an outlet 26 from the second chamber 22. In use, a liquid flows via the inlet 24 through the first chamber 20, via the connecting tube 27 into the second chamber 22, and is discharged from the second chamber 22 via the outlet 26. In other words, the first chamber 20 is operatively downstream the inlet 24, the second chamber 22 is operatively downstream the first chamber 20, and the outlet 26 is operatively downstream the second chamber 22. Although the first and second chambers 20 and 22 have been shown joined by a conduit, 24, it will be appreciated that the first and second chambers 20 and 22 may alternatively be coterminous, with no constriction (or connecting tube 27) therebetween.

The venturi 14 is disposed operatively upstream the inlet 24 to the first chamber 20. The venturi 14 defines a constricted section (that, in use subjects liquid flowing therethrough to a higher velocity and a lower pressure) and includes a gas inlet 28 at or near such constricted section for, in use, introducing gas bubbles into liquid flowing therethrough. In use, the venturi 14 introduces at least 1,000,000 bubbles having a diameter greater than 50 µm per 1,000 ml of liquid flowing through the venturi 14. Generally speaking, the venturi entrains macro-bubbles (i.e. bubbles having a diameter greater than 50 µm) into liquid flowing towards the inlet 24.

Although the inlet 24 has been described as being operatively downstream of the venturi 14, it will be appreciated that the venturi 14 outlet and the inlet/first chamber 20 may be coterminous, with no constriction therebetween (as shown in the Figures).

The static mixer 16 comprises a plurality of blades 30. The first chamber 20 does not include a gas inlet to supplement gas into the liquid in the first chamber 20. Instead, in use, the macro-bubbles entrained in the liquid in the first chamber 20 (which were originally primarily introduced via the venturi 14) are merely divided/cut into smaller, micro-bubbles (i.e. bubbles having a diameter between 1 µm and 50 µm. In use, the static mixer reduces the size of bubbles entrained in the liquid within the first chamber 20 such that each 100 ml of liquid exiting the first chamber 20 includes at least 10,000,000 bubbles having a diameter between 1 µm and 50 µm.

The magnetic bubble divider 18 comprises a set of first magnets 32 and a set of second magnets 34. The set of first magnets 32 is mounted on a rotatable first disc 36 disposed within the second chamber 22. The set of second magnets 34 is mounted on the internal wall of the second chamber 22, proximal the rotatable first disc 36 (which portion of internal wall may extend radially into the second chamber 22, as shown in FIG. 1). The Figures show additional (optional) rotating discs 37 with (optional) first magnets 33 coupled with additional sets of (optional) second magnets 35 on the internal wall of the second chamber 22/on a static drum 39. The second chamber 22 does not include a gas inlet to supplement gas into the liquid in the second chamber 22. The set of first magnets 32 and the set of second magnets 34 are arranged such that the polarity of the set of first magnets 32 and 33 is opposite the polarity of the set of second magnets 34 and 35. In use, as the rotatable disc 36 (optionally, including disc 37) rotates relative to the static set of second magnets 34 (optionally, including magnets 35), the flux fields generated by the set of first magnets 32 and 33 interfere with the flux fields generated by the second magnets 34 and 35, and the shearing flux fields cause the micro bubbles generated by the static mixer 16 in the liquid introduced into the second chamber 22 to be divided further into nano-bubbles (i.e. bubbles having a diameter less than 100 nm). In use, the magnetic bubble divider 18 reduces the size of bubbles entrained in the liquid such that each 1 ml of liquid exiting the second chamber 22 includes at least 100,000,000 bubbles (preferably, 200,000,000 bubbles) having a diameter less than 100 nm.

It will be appreciated that, although the set of second magnets 34 and 35 has been described as "static", i.e. being mounted to the second chamber 22 wall/a static drum 39, the set of second magnets 34 and 35 could alternatively be mounted to a second (or further) rotatable disc(s) (not shown) that is/are co-axial with the first rotatable disc 36 (and/or 37) and that counter-rotates relative to the first rotatable disc 36 (and/or 37).

According to a second aspect of the invention, there is provided a method of generating nano-bubbles using the nano-bubble generator 10, which method includes the steps of:

the venturi 14 introducing into a liquid at least 1,000,000 bubbles having a diameter greater than 50 µm per 1,000 ml of liquid;

the static mixer 16 reducing the size of bubbles entrained in the liquid such that each 100 ml of liquid exiting the second chamber 20 includes at least 10,000,000 bubbles having a diameter between 1 µm and 50 µm; and the magnetic bubble divider 18 further reducing the size of bubbles entrained in the liquid such that each 1 ml of liquid exiting the second chamber includes at least 100,000,000 bubbles (preferably 200,000,000 bubbles) having a diameter less than 100 nm.

A test was conducted on the apparatus shown in the Figures. During the test: (i) the motor (and, therefore, the rotatable first disc 36 on which the first magnets 32 are mounted) was rotated 2,800 rpm; (ii) 400 liters of water flowed through the nano-bubble generator 10 per minute; and (iii) the venturi 14 introduced 172 liters of air per minute into the water flowing through the nano-bubble generator 10. The water exiting the second chamber 22 contained 222,000,000 nano bubbles having an average size of 76 nm.

The two-phase method of generating nano-bubbles (e.g. converting macro-bubbles into micro-bubbles using a static mixer and thereafter converting micro-bubbles into nano-bubbles using a magnetic bubble divider) at least to come extent addresses the drawback of prior art relating to a significant portion of the nano-bubbles escaping from the liquid within a relatively short period of time.

The invention claimed is:

1. A nano-bubble generator including:
    a housing defining:
        an inlet for receiving a liquid with entrained macro-bubbles;
        a venturi disposed operatively upstream of the housing inlet;
        a first chamber operatively downstream of the inlet;
        a second chamber operatively downstream of the first chamber; and
        an outlet operatively downstream of the second chamber;
    at least one blade disposed within the first chamber for, in use, cutting macro-bubbles entrained in the liquid to convert such macro-bubbles into micro-bubbles;
    at least one first magnet within the second chamber; and
    at least one second magnet associated with the second chamber,
    wherein: (i) the at least one first magnet and the at least one second magnet are arranged such that the polarity of the at least one first magnet is opposed to the polarity of the at least one second magnet; and (ii) the at least one first magnet is movable relative to the at least one second magnet.

2. A nano-bubble generator according to claim 1, wherein the first chamber with the at least one blade disposed therein comprises a static mixer.

3. A nano-bubble generator according to claim 2, wherein the at least one first magnet is mounted on a rotatable first disc.

4. A nano-bubble generator according to claim 3, wherein the venturi is provided for, in use, introducing macro-bubbles into liquid flowing towards the housing inlet.

5. A nano-bubble generator according to claim 4, wherein the venturi includes a gas inlet at or near the venturi constricted section.

6. A nano-bubble generator according to claim 5, only the venturi includes a gas inlet, such that the only gas that is introduced into the liquid is introduced into the liquid via the venturi.

7. A method of generating nano-bubbles using a nano-bubble generator according to claim 6, which method includes the steps of:
- the venturi introducing into a liquid at least 1,000,000 bubbles having a diameter greater than 50 µm per 1,000 ml of liquid;
- the static mixer reducing the size of bubbles entrained in the liquid such that each 100 ml of liquid exiting the first chamber includes at least 10,000,000 bubbles having a diameter between 1 µm and 50 µm; and
- the opposed at least one first magnet and at least one second magnet further reducing the size of bubbles entrained in the liquid such that each 1 ml of liquid exiting the second chamber includes at least 100,000,000 bubbles having a diameter less than 100 nm.

* * * * *